Figure 1:
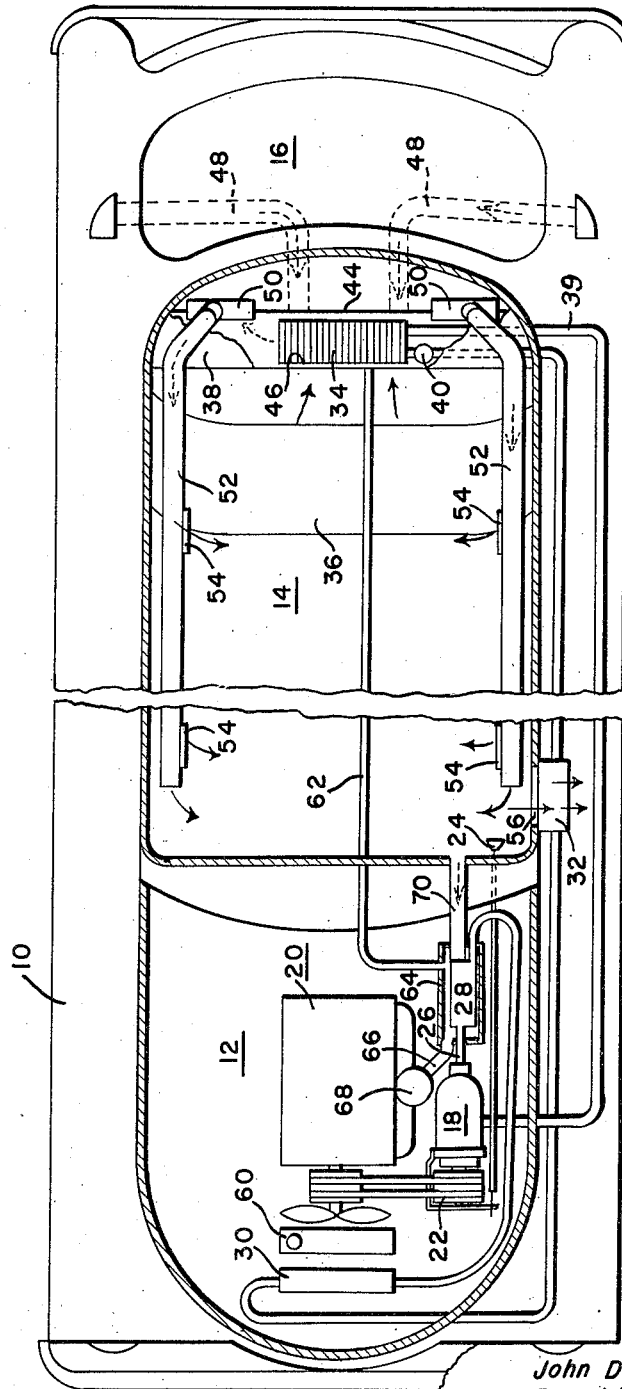

INVENTORS
John Dolza
Ronald C. Wilson
BY
G. H. Strickland
Attorney.

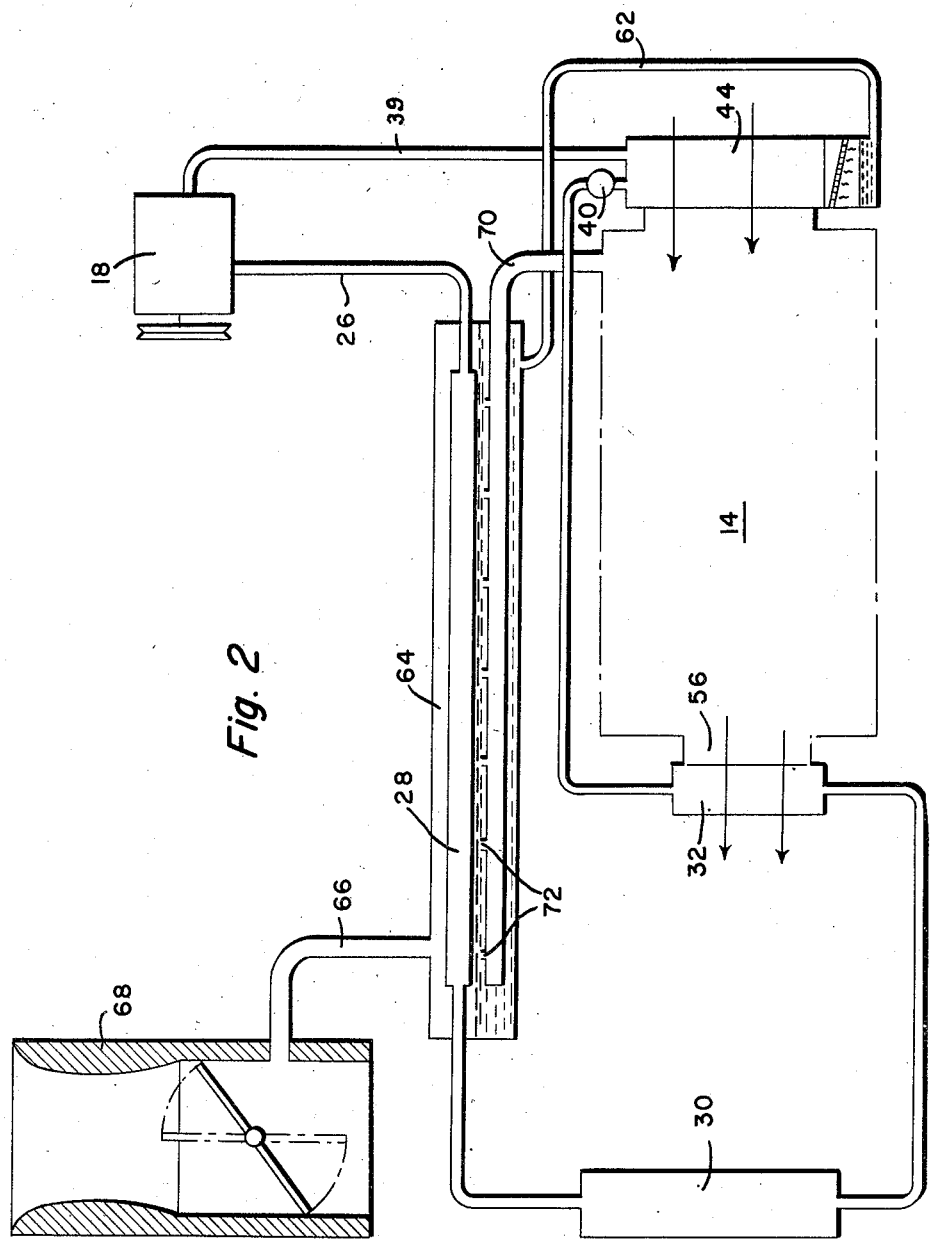

United States Patent Office 2,820,351
Patented Jan. 21, 1958

2,820,351
REFRIGERATING APPARATUS FOR AN AUTOMOBILE

John Dolza, Davisburg, and Ronald C. Wilson, Royal Oak, Mich., assignors to General Motors Corporation, Detroit, Mich., a corporation of Delaware Application January 8, 1954, Serial No. 402,902

4 Claims. (Cl. 62—117.1)

This invention relates to refrigerating apparatus and more particularly to an automobile air conditioning system.

It is an object of this invention to provide an improved automobile air conditioning system having means for increasing the condensing capacity of the system at low car speeds. More particularly it is an object to provide means for using the condensed water from the evaporator and the exhaust air from the conditioned passenger compartment for cooling the condenser.

Another object of this invention is to increase the condenser capacity by vaporizing the condensate water in thermal exchange with a portion of the condenser while the water is maintained at subatmospheric pressure.

Still another object of this invention is to increase the condenser capacity while keeping the units physically small.

Further objects and advantages of the present invention will be apparent from the following description, reference being had to the accompanying drawings, wherein a preferred form of the present invention is clearly shown.

In the drawings:

Figure 1 is a plan view largely schematic and with parts broken away showing the invention as applied to a modern automobile; and, Figure 2 is a schematic view showing in greater detail the refrigeration system.

Referring now to the drawing wherein a preferred embodiment of the invention has been shown, reference numeral 10 generally designates a conventional passenger automobile having the usual engine compartment 12, passenger compartment 14 and luggage compartment 16. The air conditioning apparatus for use in cooling the passenger compartment comprises a compressor 18 which is adapted to be driven from the main car engine 20 through a clutch 22. The clutch 22 is provided with a manual operator 24 located adjacent the instrument panel so as to enable the driver of the car to manually control the clutch so as to render the air conditioning system ineffective when no cooling is desired. Insofar as certain aspects of the invention are concerned any other type of compressor drive and control arrangement could be used equally well.

The compressed refrigerant leaves the compressor 18 through a discharge line 26 which directs the hot compressed refrigerant into a multiple stage condensing means consisting of first, second, and third stage condensing means 28, 30 and 32 respectively. The condensed refrigerant is then supplied to an evaporator 34 which for purposes of illustration has been shown located directly behind the rear seat 36 under the usual package shelf 38. The refrigerant vaporized in the evaporator 34 is returned to the compressor 18 through the usual suction line 39. The flow of refrigerant to the evaporator 34 may be controlled by any conventional type of refrigerant flow control device. For purposes of illustration a system using a thermostatic expansion valve 40 has been shown whereas a fixed restrictor or any other type of control could be used.

The air to be conditioned preferably consists of a mixture of fresh air and recirculated air and may enter the housing 44 in which the evaporator 34 is located through a return air opening 46 provided in the top wall of the housing 44 (see Figure 1) and suitable fresh air inlets 48 which serve to introduce a predetermined amount of fresh air into the housing 44 in accordance with well known practice. Suitable blower means 50 have been provided for handling the air to be conditioned. In the system illustrated the blower means 50 discharge the conditioned air into air ducts 52 located at the upper sides of the passenger compartment. These ducts are provided with suitable air outlets 54 through which the conditioned air is discharged into the passenger compartment of the car.

It is desirable to introduce fresh air into the passenger compartment and it is also desirable to exhaust a corresponding amount of air from the passenger compartment into the outside atmosphere. This air which is exhausted to the outside has been cooled considerably below the temperature of the outside air and consequently may be utilized to advantage in cooling the third stage condenser 32. In the illustrated embodiment of the invention the third stage condenser 32 has been shown located directly opposite an air outlet opening 56 located in the side wall of the passenger compartment. Insofar as this invention is concerned the air outlet 56 could be arranged in any other location equally well.

The second stage condenser 30 is adapted to be mounted directly in front of the main car radiator engine 60 so as to be cooled by the outside air stream entering the front of the engine compartment in accordance with standard practice whereas the first stage condenser is preferably located in the engine compartment adjacent the suction manifold for a purpose to be explained more fully hereinafter.

The bottom of the evaporator housing 44 serves to collect condensate water which drains from the evaporator and this water may also be used to advantage in condensing the compressed refrigerant. In order to make maximum use of this water it is drained from the bottom of the evaporator housing through a line 62 which leads to a housing 64 which encloses the first stage condenser 28. In order to facilitate the evaporation of the condensate water within the housing 64 a conduit 66 connects the housing 64 to the suction manifold 68 of the main car engine carburetor. The pressure within the housing 64 is thus maintained at a subatmospheric pressure with the result that the water will be vaporized at a lower temperature than would otherwise be possible. A conduit 70 has been provided for conveying a small portion of the relatively cold conditioned air from the passenger compartment 14 into the housing 64 so as to further utilize a portion of the relatively cold conditioned air in cooling the first stage condenser portion 28 and further lower the evaporating temperature of water by reducing the partial pressure of the water vapor. As best shown in Figure 2 of the drawing the air which enters the housing 64 through the conduit 70 discharges onto the bottom side of the condenser section 28 through a plurality of restricted ports 72 which at times may actually be submerged by the condensate water supplied to the housing 64 through the lines 62 whereby the air leaving the ports 72 will pick up droplets of water and deposit the water on the surface of the condenser 28.

While the form of embodiment of the invention as herein disclosed constitutes a preferred form, it is to be understood that other forms might be adopted, as may came within the scope of the claims which follow.

What is claimed is as follows:

1. In combination with an automobile having a passenger compartment; air conditioning apparatus for said passenger compartment comprising a compressor, an evaporator, and condensing means; refrigerant flow connections between said compressor, evaporator, and condensing means; means for circulating air for said passenger compartment in thermal exchange relationship with said evaporator; means for exhausting air from said passenger compartment; said condensing means including a condensing element in thermal exchange with the air thus exhausted; means for collecting condensate water which drains from the surface of said evaporator; means for vaporizing said condensate water in thermal exchange relationship with a portion of said condensing means; said automobile having an engine; torque transmitting means between said engine and said compressor; said engine having a suction manifold; and means for connecting the intake to the said suction manifold with said means for vaporizing said condensate water so as to vaporize said water at subatmospheric pressures.

2. In combination with an automobile having an engine compartment and a passenger compartment, air conditioning apparatus for said passenger compartment comprising a compressor, an evaporator, and condenser means having first, second and third stages, means for vaporizing water at subatmospheric pressure in thermal exchange relationship with said first stage, said second stage being arranged in thermal exchange relationship with air outside said passenger compartment, and means for circulating air from said passenger compartment over said third stage.

3. In combination with an automobile having an engine compartment and a passenger compartment, an engine in said engine compartment, air conditioning apparatus for said passenger compartment including a compressor, an evaporator and a condenser, said engine having a suction manifold, means for circulating air for said passenger compartment in thermal exchange relationship with said evaporator so as to condense moisture from the air for said passenger compartment, and means for revaporizing said condensed moisture in thermal exchange relationship with a portion of said condensing means, said last named means comprising a condensate receptacle arranged in thermal exchange relationship with a portion of said condenser, and means for connecting said suction manifold to said receptacle so as to produce subatmospheric pressures in said receptacle.

4. In combination with an automobile having an engine compartment and a passenger compartment, an engine in said engine compartment, air conditioning apparatus for said passenger compartment including a compressor, an evaporator and a condenser, said engine having a suction manifold, means for circulating air for said passenger compartment in thermal exchange relationship with said evaporator so as to condense moisture from the air for said passenger compartment, and means for revaporizing said condensed moisture in thermal exchange relationship with a portion of said condensing means, said last named means comprising a condensate receptacle arranged in thermal exchange relationship with a portion of said condenser, means for introducing air from said passenger compartment into said condensate receptacle, and means for connecting said receptacle to said suction manifold so as to maintain the pressure therein below atmospheric pressure.

References Cited in the file of this patent

UNITED STATES PATENTS

| 2,260,275 | Kalischer | Oct. 21, 1941 |
| 2,315,222 | Phillip | Mar. 30, 1943 |
| 2,323,511 | Baker | July 6, 1943 |
| 2,479,170 | Kuempel | Aug. 16, 1949 |
| 2,579,512 | Perrine | Dec. 25, 1951 |